(12) United States Patent
Lara et al.

(10) Patent No.: US 10,673,893 B2
(45) Date of Patent: Jun. 2, 2020

(54) ISOLATING A SOURCE OF AN ATTACK THAT ORIGINATES FROM A SHARED COMPUTING ENVIRONMENT

(71) Applicant: International Business Machines Corporation, Armonk, NY (US)

(72) Inventors: Juan G. Lara, Dublin (IE); Mark A. McGloin, Dublin (IE); Olgierd S. Pieczul, Dublin (IE); Ralph L. Topete, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 15/252,453

(22) Filed: Aug. 31, 2016

(65) Prior Publication Data
US 2018/0063199 A1 Mar. 1, 2018

(51) Int. Cl.
| | | |
|---|---|---|
| *G08B 23/00* | (2006.01) | |
| *G06F 12/16* | (2006.01) | |
| *G06F 12/14* | (2006.01) | |
| *G06F 11/00* | (2006.01) | |
| *H04L 29/06* | (2006.01) | |

(52) U.S. Cl.
CPC ........ *H04L 63/1458* (2013.01); *H04L 63/145* (2013.01); *H04L 2463/144* (2013.01); *H04L 2463/146* (2013.01)

(58) Field of Classification Search
CPC ..................................................... H04L 63/30
USPC ........................................................ 726/23
See application file for complete search history.

(56) References Cited

U.S. PATENT DOCUMENTS

| | | | |
|---|---|---|---|
| 7,269,850 B2 | 9/2007 | Govindarajan et al. | |
| 7,487,541 B2 | 2/2009 | Robert | |
| 7,801,046 B2 | 9/2010 | Persson et al. | |
| 8,312,544 B2 | 11/2012 | Tripathi et al. | |
| 2004/0083369 A1* | 4/2004 | Erlingsson | G06Q 20/401 713/176 |

(Continued)

FOREIGN PATENT DOCUMENTS

JP 3699941 7/2005

OTHER PUBLICATIONS

Ahmed M. Azab; SICE: A Hardware-Level Strongly Isolated Computing Environment for x86 Multi-core Platforms; ACM 2011; p. 375-388.*

(Continued)

*Primary Examiner* — Monjur Rahim
(74) *Attorney, Agent, or Firm* — Schmeiser, Olsen & Watts; Mark C. Vallone

(57) ABSTRACT

A method and associated systems for isolating a source of an attack that originates from a shared computing environment. A computer-security system tags outgoing packets originating from within the shared computing environment in a tamper-proof manner in order to identify which tenant of the shared environment is the true source of each packet. If one of those tenants transmits malicious packets to an external recipient, either because the tenant has malicious intent or becomes infected with malware, the transmitted malicious packets' tags allow the recipient to determine which tenant is the source of the unwanted transmissions. The recipient may then block further communications from the problematic tenant without blocking communications from other tenants of the shared environment.

20 Claims, 4 Drawing Sheets

(56) References Cited

U.S. PATENT DOCUMENTS

| | | | |
|---|---|---|---|
| 2005/0044208 A1 | 2/2005 | Jones et al. | |
| 2009/0044276 A1* | 2/2009 | Abdel-Aziz | H04L 63/1425 |
| | | | 726/24 |
| 2010/0071024 A1* | 3/2010 | Eyada | H04L 63/0263 |
| | | | 726/1 |
| 2010/0192225 A1* | 7/2010 | Ma | G06F 17/30985 |
| | | | 726/23 |
| 2012/0039323 A1* | 2/2012 | Hirano | H04W 36/385 |
| | | | 370/338 |
| 2015/0052600 A1* | 2/2015 | Weinsberg | H04L 12/4641 |
| | | | 726/13 |
| 2015/0128246 A1* | 5/2015 | Feghali | H04L 63/0209 |
| | | | 726/13 |
| 2016/0094384 A1* | 3/2016 | Jain | H04L 41/0803 |
| | | | 709/221 |
| 2017/0171159 A1* | 6/2017 | Kumar | H04L 63/0281 |

OTHER PUBLICATIONS

Yaar et al., Pi: A Path Identification Mechanism to Defend against DDoS Attacks, Proceedings of the 2003 IEEE Symposium on Security and Privacy, URL:http://ieeexplore.ieee.org/xpl/login.jsp?tp=&arnumber=1199330&url=http%3A%2F%2Fieeexplore.ieee.org%2Fxpls%2Fabs_all.jsp%3Farnumber%3D1199330, 15 pages.

\* cited by examiner

ISOLATING A SOURCE OF AN ATTACK THAT ORIGINATES FROM A SHARED COMPUTING ENVIRONMENT

TECHNICAL FIELD

The present invention relates to computer security and relates in particular to identifying the source of a malware attack that originates from an unidentified user of a shared computing environment.

BACKGROUND

An outgoing communication originating from certain cloud, multi-tenant, or other types of multi-user computing environments, may not identify the particular user that sent the communication. This may occur, for example, in a Platform as a Service ("PaaS") cloud-computing environment that provides each user a complete virtualized computing platform, including network and infrastructure, operating systems, middleware, storage, and applications. This may also occur in other types of multi-user environments, such as a workgroup that is identified to outside parties by only a single IP address of a router or firewall.

In some cases, a user or application comprised by a multi-user environment may occupy an isolated, self-contained container (or other type of compartmentalized or preconfigured operating environment), provided by a means known in the art, such as a Warden server or a Docker container. In such cases, an outgoing TCP/IP or Ethernet message may contain information that identifies the environment from which it originated, but does not identify the sender's particular container. Similarly an outgoing TCP/IP or Ethernet message may contain information that identifies a container from which it originated, but does not identify the particular user or application within that container as being the true sender.

When an application or user of a multi-user operating environment becomes infected with malware, or when a user itself has malicious intent, that application or user may transmit malicious communications to third parties outside the multi-user environment. The attacked recipient may attempt to respond by blacklisting, or taking other action against, the perceived attacker. But if a malicious communication identifies only the multi-user environment, not the particular source application or user, the recipient may not be able to identify the true sender. The recipient's response, therefore, may be directed against the entire multi-user environment, blacklisting or otherwise blocking further communications from all occupants of the multi-user environment. As a result, users that present no threat to the external party may find themselves blocked.

BRIEF SUMMARY

A first embodiment of the present invention provides a computer-security system comprising a processor, a memory coupled to the processor, and a computer-readable hardware storage device coupled to the processor, the storage device containing program code configured to be run by the processor via the memory to implement a method for isolating a source of an attack that originates from a shared computing environment, the method comprising:

the computer-security system intercepting an outgoing network packet that originates from a first tenant of the shared computing environment, where the outgoing network packet does not identify the first tenant as a sender of the outgoing network packet, and the system adding to the outgoing network packet a tag that identifies the first tenant, such that an external recipient of the outgoing network packet may identify that the outgoing network packet originated from the first tenant.

A second embodiment of the present invention provides a method for isolating a source of an attack that originates from a shared computing environment, the method comprising:

the computer-security system intercepting an outgoing network packet that originates from a first tenant of the shared computing environment, where the outgoing network packet does not identify the first tenant as a sender of the outgoing network packet; and the system adding to the outgoing network packet a tag that identifies the first tenant, such that an external recipient of the outgoing network packet may identify that the outgoing network packet originated from the first tenant.

A third embodiment of the present invention provides a computer program product, comprising a computer-readable hardware storage device having a computer-readable program code stored therein, the program code configured to be executed by computer-security system comprising a processor, a memory coupled to the processor, and a computer-readable hardware storage device coupled to the processor, the storage device containing program code configured to be run by the processor via the memory to implement a method comprising:

the computer-security system intercepting an outgoing network packet that originates from a first tenant of the shared computing environment, where the outgoing network packet does not identify the first tenant as a sender of the outgoing network packet, and the system adding to the outgoing network packet a tag that identifies the first tenant, such that an external recipient of the outgoing network packet may identify that the outgoing network packet originated from the first tenant.

DETAILED DESCRIPTION

Figure 1:
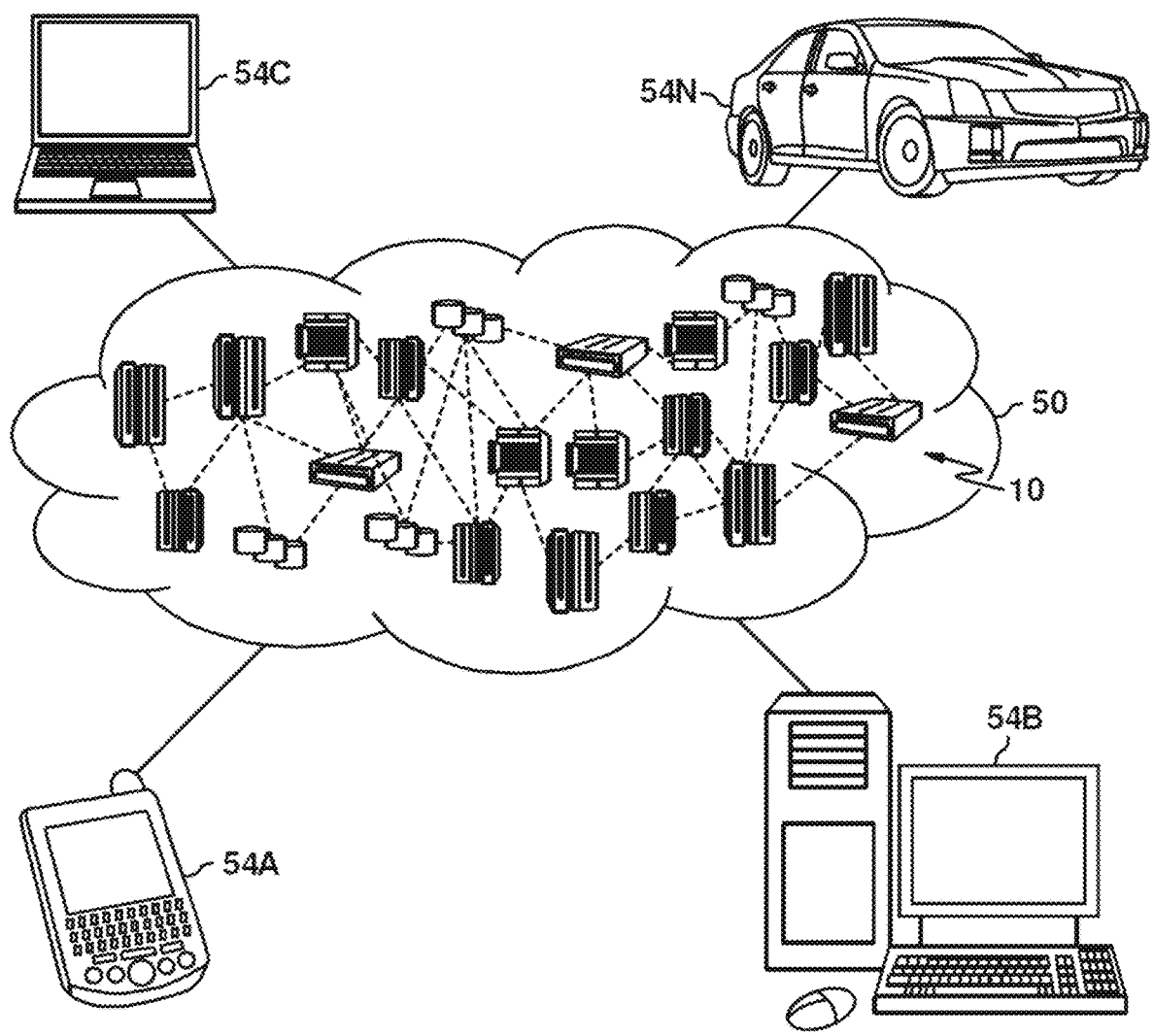
FIG. 1 shows a cloud-computing environment.

Network packets sent by a user or application of a multi-user environment to a third party outside of the multi-user environment may identify as a sender only the environment, not the particular user or application. If such a user or application becomes infected with malware, or if a user itself has malicious intent, resulting in the user or application transmitting malicious network traffic to an external third party, that external third-party recipient will not be able to identify which user is the true source of the attack. The recipient may then have no choice but to take defensive action against all occupants of the environment, such as blocking all messages that originate from the environment.

Embodiments of the present invention solve this problem by embedding a more precise identifier into a special area of each outgoing network packet in such a way that an infected user or application cannot tamper with the identifier. Recipients can then examine the special area in order to determine the true source of the packet. This allows recipients to selectively block further communications identified as coming from the infected user, container, or application (or take other remedial actions against the infected entity), while taking no action against messages sent by other entities within the multi-user environment.

In one example, the multi-user environment may be a multi-tenant cloud-computing platform and each user may be a user of a Platform-as-a-Service ("PaaS") service provisioned on resources of the cloud. In such cases, multiple users and applications may each be provisioned within a distinct instance of a container (such as a Docker container) and two of more of these containers may be provisioned on a same virtual machine.

If one of those containers begins to send malicious traffic to a third-party recipient outside of the cloud, the third party may respond by blocking all future traffic that the third party perceives to originate from the source of the attack. This scenario may occur, for example, when a container begins transmitting large volumes of data as part of a distributed denial-of-service (DDoS) attack.

In an IP-based communications environment each network packet contains a header that identifies the IP address of the packet's sender. But in the above example, a packet may identify as a sender only a publicly visible address of a virtual machine, container, or cloud from which the packet was sent, preventing recipients from identifying the true source of the attack. Worse, even a PaaS provider (or other cloud-services provider) that detects inbound attacks may not inspect outbound traffic, and may thus be unaware of the malicious transmissions. The attacked recipient, therefore, has little choice but to block all traffic arriving from an identified user, virtual machine, container, or cloud. And if a Web site or other recipient runs an application that automatically blocks incoming messages from an IP address associated with a DDoS attack, neither the PaaS provider nor the recipient may be aware of the problem.

In this example, the present invention provides a technical solution to this problem by inserting a special identifier into each outgoing IP packet. Compliant external recipients then extract this identifier from incoming messages and use the identifier to precisely identify the true source of the message.

This special identifier may comprise a process "signature" code that identifies a "process owner" that is the true source of the outgoing IP packet. A process owner may be, for example, an individual user account, application, virtual machine, or container in a cloud environment, or a particular user of a workgroup or local-area network. IPv4 packets may be stamped with this process signature by inserting the signature code into any unused header field available in IPv4 packets. IPv6 packets may be stamped with a process signature by inserting the signature code into a custom header or into any other field that is not otherwise used to store data.

Other embodiments of the present invention may be used to solve an analogous problem of identification in any other multi-user environment where an identify of an attacking entity is obfuscated behind a firewall, router, Web server, or other device. In yet other embodiments, other types of communications packets may be stamped in a similar way by inserting a process-signature code into any unused field or into any custom, user-definable field supported by the packet's associated communications protocol.

In all cases, the present invention embeds its identifier such that an infected entity cannot tamper with the identifier. For example, in the previous IPv4 example, a communication between the Application layer 7 and the Transport layer 4 of the OSI model is required to embed a process signature into a network packet at a layer where the packet can be filtered or blocked by a firewall in order to prevent a DDoS attack.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
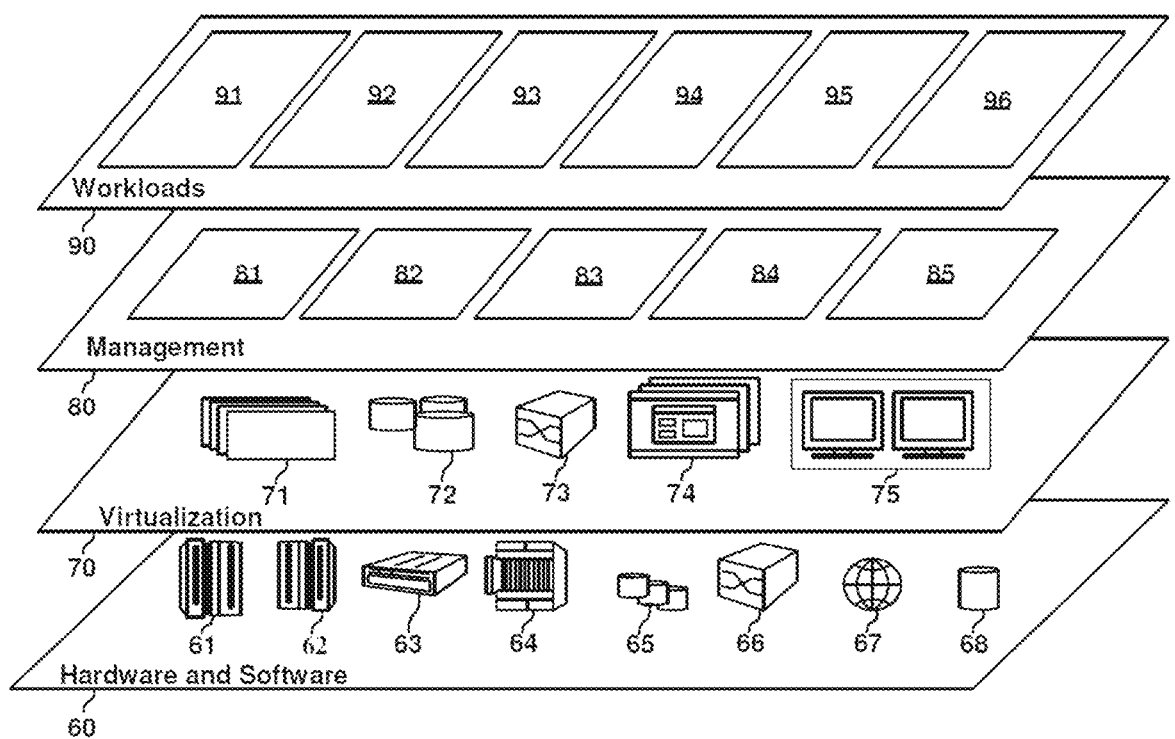
FIG. 2 shows a set of functional abstraction layers provided by a cloud computing environment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex networking and security tasks 96.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
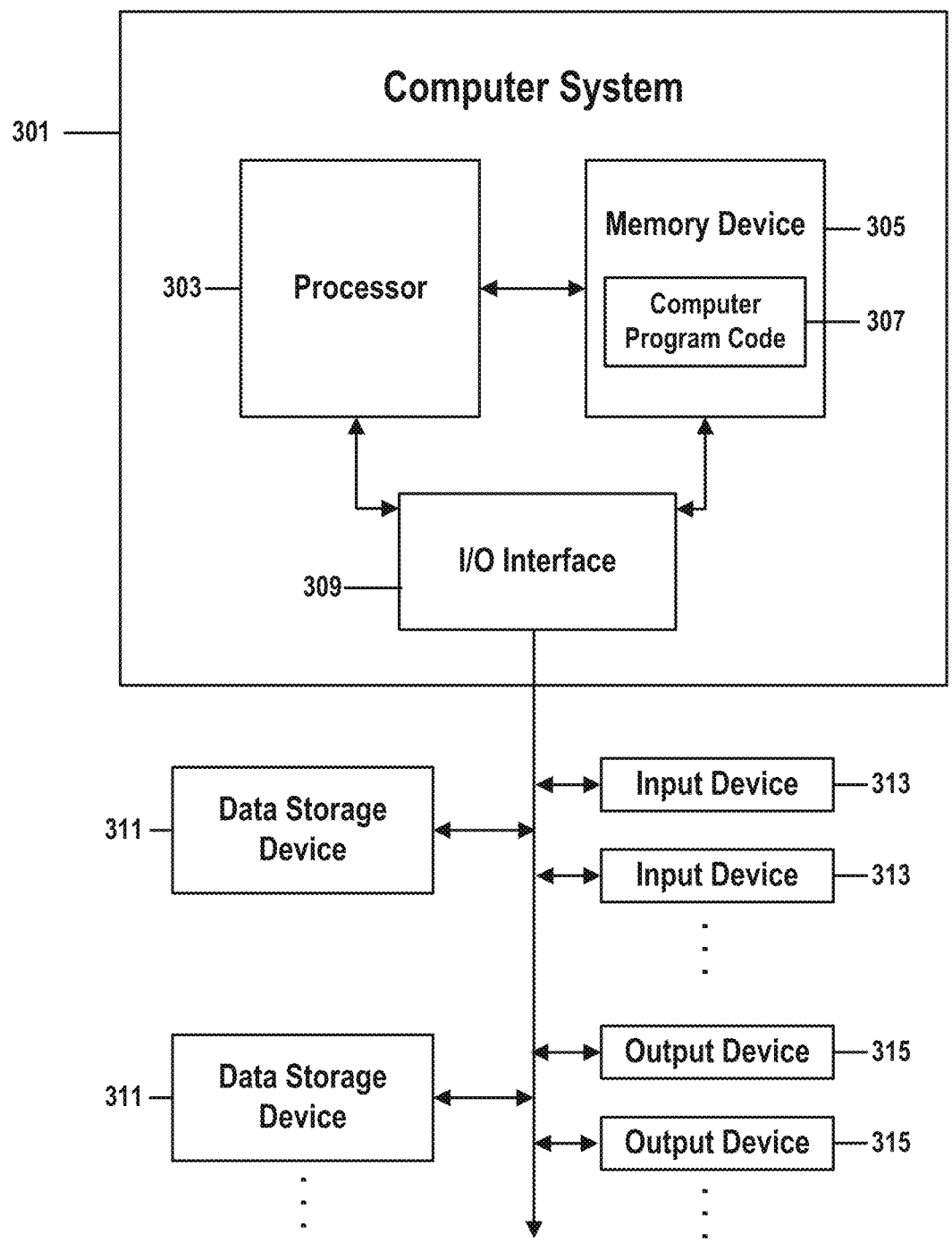
FIG. 3 shows a structure of a computer system and computer program code that may be used to implement a method for isolating a source of an attack that originates from a shared computing environment in accordance with embodiments of the present invention.

FIG. 3 shows a structure of a computer system and computer program code that may be used to implement a method for isolating a source of an attack that originates from a shared computing environment in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for isolating a source of an attack that originates from a shared computing environment in accordance with embodiments of the present invention, and may implement other embodiments described in this specification, including the methods illustrated in FIGS. 1-4. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for isolating a source of an attack that originates from a shared computing environment.

Any of the components of the present invention could be created, integrated, hosted, maintained, deployed, managed, serviced, supported, etc. by a service provider who offers to facilitate a method for isolating a source of an attack that originates from a shared computing environment. Thus the present invention discloses a process for deploying or integrating computing infrastructure, comprising integrating computer-readable code into the computer system 301, wherein the code in combination with the computer system 301 is capable of performing a method for isolating a source of an attack that originates from a shared computing environment.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

While it is understood that program code 307 for a method for isolating a source of an attack that originates from a shared computing environment may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for isolating a source of an attack that originates from a shared computing environment is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
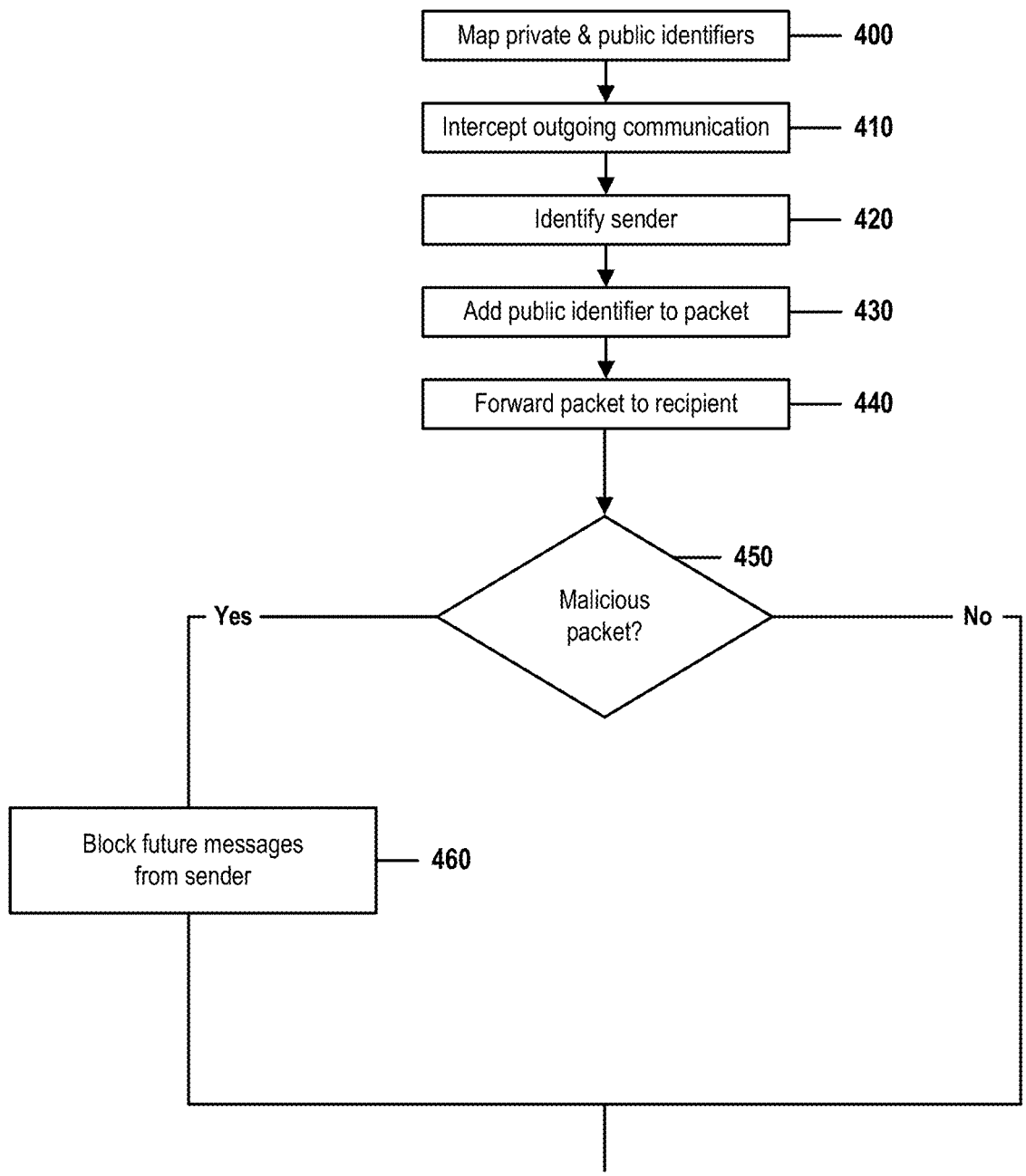
FIG. 4 is a flow chart that illustrates the steps of a method for isolating a source of an attack that originates from a shared computing environment in accordance with embodiments of the present invention.

FIG. 4 is a flow chart that illustrates the steps of a method for isolating a source of an attack that originates from a shared computing environment in accordance with embodiments of the present invention. FIG. 4 contains steps 400-460.

In step 400, a processor of a computer-security system configures a multi-user computerized operating environment to perform methods of the present invention by mapping each internal "private" identifier of a tracked entities within the operating environment to a corresponding, externally visible, "public" identifier.

The operating environment may be any multi-user environment, such as a cloud-computing environment populated by tenants that are each provisioned by a Docker container or as a Platform-as-a-Service offering of a PaaS vendor. In other examples, the operating environment may be a virtual or physical local-area network populated by network users, or a multi-user software application capable of transmitting messages through a computer network.

In each case, the multi-user environment is configured such that the environment's management entity (such as a cloud controller, a cloud-management stack, a hypervisor, a network server, or an application server) identifies certain tracked occupants of the environment by means of internal addresses, such as IP addresses or hostnames.

These tracked occupant entities may, for example, comprise a combination of Docker containers, software applications provisioned by one or more containers, users working with resources provided by a container, member of workgroups, or virtual machines.

The multi-user environment may be further configured such that the internal private identifiers are not visible to external entities that communicate with the tracked occupants of the environment. In one example, in which ten applications are provisioned by the same container of a multi-user environment, messages sent to recipients outside the environment by any of those applications may identify only the originating container, not the specific sending application.

In such a case, this constraint will not cause a problem when transactions are conducted entirely within the multi-user environment when the management entity routes internal messages between users by means of the internal "private" identifiers. But when an external recipient not privy to the internal identifiers receives a message outside the environment, that external recipient has no way of knowing which user sent the received message.

In embodiments of the present invention, the processor addresses this problem by creating and associating a unique, externally visible, "public" identifier with each tracked occupant of the multi-user environment. Each tracked occupant is thus associated with both a conventional internal private identifier (invisible to external entities outside the environment) and an external public identifier that is visible to external entities.

An implementer is free to select which occupants of the multi-user environment to track as a function of implementation-dependent priorities. In a PaaS cloud-computing environment, for example, an implementer may track every user. In a virtualized environment in which resources are provisioned by means of containers, an implementer may choose to track each container. In a distributed workgroup hidden behind a router, each computer of the workgroup may be tracked.

Both the private and public identifiers may be selected, organized and stored by any means known in the art, such as in database records, a flat file, or a simple, text-based table. What is important is that the environment-management entity be able to use the stored data to quickly associate a private identifier of a particular tracked entity with a known public identifier of that same entity. Similarly, given a known private identifier of a tracked entity, the environment-management entity must be able to quickly associate that private identifier with a corresponding public identifier of the same entity.

The private and public identifiers may each take any form known in the art, such as a fixed-length or variable-length alphanumeric string, an IP address or other type of network address, or a decimal, binary, BCD, or hexadecimal code.

The data stored in this step may be forwarded to any possible recipient of outgoing messages sent from the multi-user environment. The data may be forwarded in any form known in the art, depending on the preferences of each recipient. In some embodiments, the entire data structure created in step 400 may be forwarded intact to each recipient.

In step 460, each recipient will use the forwarded data to determine the true sender of a message sent from the multi-user environment.

Step 400 may need to be performed only once, or may need to be performed when a new user, container instance, application instance, or other tracked occupant entity is added to or removed from the multi-user environment. Subsequent steps 410-460, on the other hand, may be performed every time an outgoing packet is generated by a tracked entity.

In step 410, the processor identifies and intercepts an outgoing network communication generated by a tracked entity before the communication can leave the multi-user environment. This communication may be any type of outgoing message or component of such a message, such as an Ethernet packet that conforms to the IPv4 or IPv6 standard.

The identification and interception may be performed by any means known in the art, or in any manner capable of being performed by a software application, network-management entity, or cloud-management component responsible for directing communications among internal components.

In step 420, the processor, by means known in the art, identifies the sender of the communication captured in step 410. This may be via an internal identifier known to the multi-user environment or any other internal mechanism to track senders of communication. This identifier may, for example, be read from the Sender field of a network packet comprised by the communication or may be inferred from a combination of a port address and a virtual-machine private IP address of a container that sends the captured communication.

In step 430, the processor selects a public identifier that corresponds to the internal private identifier read in step 420. This selection may be performed by means of the information stored in step 400. If, for example, a particular container is internally identified by an IP address 177.16.255.5, the processor might in this step look up this address in a database table populated by the processor in step 400. If the table associates this internal address with an identifier "90043" that identifies the particular container, the processor would, by means known in the art, embed a representation of the value 90043 into the captured packet.

This embedding may be performed by any means known in the art, and in some embodiments, by means that are implementation-dependent. If, for example, the multi-user environment transmits a message outside the multi-user environment as a set of packets that conform to the IPv4 standard, the embedding may be implemented by embedding the representation into any header field of the packet that is not otherwise used. If the environment transmits IPv6 packets, the representation may be embedded into the packet as an optional extension header. In other examples, the representation may be embedded into other types of IP headers transmitted over SSL. The exact format and location of the embedded data may be selected by an implementer, using expert knowledge of an embodiment's particular implementation, by means known in the art.

In all cases, the embedding is performed at a layer of the environment's communications stack that is not accessible by the entity that sent the communication, such as a layer that resides below the Transport layer of a TCP/IP stack. If outgoing communications are encrypted by the multi-user environment, the processor may further apply a compliant encryption procedure to the representation before or after embedding it into the packet. These precautions help ensure that an infected user or application cannot circumvent the present invention by tampering with the embedded representation.

In step 440, the processor forwards the modified packet modified in step 430 in a normal manner, using any communications procedure, hardware, or technology known in the art. For example, the packet may be directed to a router, through a firewall, or to a wide-area network interface.

In step 450, a recipient of the modified packet determines whether the packet is infected, is part of an attack, or is in some other way malicious or undesirable. This determining may comprise the recipient identifying whether the modified packet originated from a "true" source that had previously been identified as being malicious or infected. In this step, we define a "true" source of a packet as being a specific application, container, user, or other shared-environment tenant that generated the message received from the shared environment. Identifying the true source of the packet may be performed by any means known in the art, such as by reading the contents of one or more fields of the packet into which was embedded, in step 430, information that identifies the packet's true source.

In one example, the recipient may attempt to determine whether the modified packet is likely to be part of a "DDoS" distributed denial-of-service attack by determining whether the modified packet originated from the same source as had previously received attack packets, or whether the modified packet shares some other identifying characteristic with previously received DDoS attack packets. In another example, the recipient may recognize that the modified packet is part of a partially received message that comprises or is otherwise associated with a virus signature.

In some embodiments, before attempting to identify the true source of the packet, the recipient may first identify the shared-environment source of the packet through means known in the art, such as by retrieving such identifying information from a conventional "Sender" field of the received packet. The recipient then attempts to determine whether the identity of the shared-environment source satisfies a predefined condition, such as whether the identified source environment complies with an embodiment of the present invention, or whether the source environment has previously comprised a container, virtual machine, application, user, or other entity known to have transmitted malicious communications. The recipient would then attempt to identify the true source of the modified packet, by means described above, only if the identified shared-environment source satisfies such a condition.

If the recipient determines that the true source of the modified packet is not, or is not likely to be, a source of unwanted network traffic, the method of FIG. 4 performs no further operations upon the received packet. But if the recipient does determine that the modified packet is part of an attack or is some other type of unwanted network traffic, the method of FIG. 4 continues with step 460.

In step 460, the recipient initiates remedial action against the packet determined in step 460 to be malicious and, optionally, against future communications received from the true sender identified by the embedded public identifier. For example, if the identifier embedded into the received packet represents a container identifier "46421," the recipient may begin blocking all communications received from the multi-user environment that comprise the public identifier 46421. But the recipient will not block communications received from the multi-user environment that identify other container identifiers. The exact type of remedial action, which may comprise blocking future packets, generating a report, notifying parties responsible for the operation of the multi-user environment, or other mechanisms known in the art, will be implementation-dependent.

In some embodiments, this blocking or other remedial action will cease when the recipient determines that the attack has ended or that the true source of the attack has been disinfected or otherwise restored to proper operation.

In one example of the present invention, consider a PaaS vendor that offers 100 different applications to each client tenant of the vendor's cloud-computing environment. When any of these applications sends a message to an external third party on the Internet, the PaaS vendor's communications infrastructure, using means known in the art, transmits the message externally as a set of Ethernet packets.

In this case, each packet does not identify the specific application, container, or client that sent the message. Instead, each packet's "Sender" IP address contains code that identifies only the PaaS vendor. A third-party recipient that receives such a packet therefore cannot identify with granularity the true source of the message. If the packet is part of an attack, the recipient cannot block messages arriving from the source of the attack without also blocking uninfected messages sent by other occupants of the PaaS vendor's cloud.

The PaaS vendor solves this problem by tagging each outgoing IP packet of an outgoing message with a public identifier that identifies the application or user that generated the message. The external recipient can identify the application or user that should be blocked by reading this identifier. Once the recipient completes this identification, the recipient may perform the blocking by automated, partially automated, or manual means known in the art.

There are many ways known in the art of generating a code that identifies an application or user and then embedding the code into a data packet. Each application may, for example, be assigned a three-digit decimal code, and a binary equivalent of such a code may be embedded into a packet as a binary number, a BCD number, or two hexadecimal digits encoded into binary code. Embodiments of the present invention merely require an identifier to be inserted into a predetermined available field of each network packet in a consistent manner, such that the identifier is capable of identifying the specific sender of the packet to compliant recipients.

When a compliant recipient receives a packet into which such a code has been embedded, the recipient might then retrieve the code from the packet and use a simple table look-up to identify the sender of the message that comprises the packet. If this message has been identified as being part of a malware attack or as being infected with malware, the recipient can then simply block, through means known in the art, all further network traffic that identifies the same sending application. When the recipient can confirm that the sender no longer presents a danger, the recipient can then easily, through means known in the art, resume accepting messages received from the previously compromised application.

An implementation may use analogous procedures to allow external parties to identify containers, virtual-infrastructure components, and other user-specific artifacts that may generate outgoing traffic sent from any type of cloud environment or other type of virtualized or non-virtualized multi-user operating environment.

Within the multi-use environment, an artifact may be identified by an internal IP address that is visible only to other entities occupying the same environment. For example, a cloud-based service provider may employ a cloud controller component to direct incoming communications to the correct user, application, container, or other tracked entity. Such a service provider may, in some embodiments, enhance its cloud controller with a table that maps these internal addresses to externally visible public IP addresses. In such embodiments, a complementary enhancement to a user-specific artifact, such as a container within which an application is deployed, can embed the container's public identifier into each outgoing packet generated by the container. This public identifier may be encoded in any available field of each outgoing packet, such as an unused ToS field, using any method known in the art. Since an entity that generates an outgoing message cannot modify the IP packets created from that message, an infected sender cannot circumvent this encoding method. Recipients are thus ensured of the reliability and accuracy of the encoded identifier.

The present invention may comprise many variations of the embodiments of this example. All embodiments, however, address the problem created when an outgoing message generated from within a multi-user environment does not identify to an external recipient an application, container, client user, or other internal source of the message. This is accomplished by enhancing a cloud controller, network-management component, or other platform-management entity to create and embed an externally visible identifier into the outgoing packet, and by enhancing the operation of external recipients to recognize the embedded identifier as identifying the true source of the received packet.

What is claimed is:

1. A computer-security system, of a shared multi-tenant Platform-as-a-Service (PaaS) cloud-computing environment in which users are prohibited from managing underlying cloud infrastructure, comprising a processor, a memory coupled to the processor, and a computer-readable hardware storage device coupled to the processor, the storage device containing program code configured to be run by the processor via the memory to implement a method for isolating a source of an attack that originates from a shared computing environment, the method comprising:
   the processor of the system intercepting an outgoing network packet that originates from a first tenant of the shared computing environment, where the outgoing network packet does not identify the first tenant as a sender of the outgoing network packet; and
   the processor adding to the outgoing network packet a tag that identifies the first tenant,
      where the adding makes it possible for an external recipient of the outgoing network packet to identify that the outgoing network packet originated from the first tenant.

2. The system of claim 1, where the external recipient is capable of determining, as a function of the identifying, how to block a future network packet originating from the first tenant without blocking future network packets originating from other tenants of the shared computing environment.

3. The system of claim 1, where the outgoing network packet is an IPv6 packet and where the tag is an extension header of the IPv6 packet.

4. The system of claim 1, where the outgoing network packet is an IPv4 packet and where the tag is an unused field of the IPv4 packet.

5. The system of claim 1, where the first tenant is a software container.

6. The system of claim 1, where the shared computing environment is a cloud-computing environment on which has been provisioned one or more Platform-as-a-Service platforms.

7. The system of claim 1, where the first tenant has been infected by malware and where the outgoing network packet is generated as part of a distributed denial-of-service attack upon the external recipient.

8. A method for isolating a source of an attack that originates from a shared computing environment, the method comprising:
   a processor of a computer-security system, of a shared multi-tenant Platform-as-a-Service (PaaS) cloud-computing environment in which users are prohibited from managing underlying cloud infrastructure, intercepting an outgoing network packet that originates from a first tenant of the shared computing environment, where the outgoing network packet does not identify the first tenant as a sender of the outgoing network packet; and
   the processor adding to the outgoing network packet a tag that identifies the first tenant,
      where the adding makes it possible for an external recipient of the outgoing network packet to identify that the outgoing network packet originated from the first tenant.

9. The method of claim 8, where the external recipient is capable of determining, as a function of the identifying, how to block a future network packet originating from the first tenant without blocking future network packets originating from other tenants of the shared computing environment.

10. The method of claim 8, where the first tenant is a software container.

11. The method of claim 8, where the shared computing environment is a cloud-computing environment on which has been provisioned one or more Platform-as-a-Service platforms.

12. The method of claim 8, where the first tenant has been infected by malware and where the outgoing network packet is generated as part of a distributed denial-of-service attack upon the external recipient.

13. The method of claim 8, further comprising providing at least one support service for at least one of creating, integrating, hosting, maintaining, and deploying computer-readable program code in the computer system, wherein the computer-readable program code in combination with the computer system is configured to implement the intercepting and the adding.

14. A computer program product, comprising a computer-readable hardware storage device having a computer-readable program code stored therein, the program code configured to be executed by a computer-security system, of a shared multi-tenant Platform-as-a-Service (PaaS) cloud-computing environment in which users are prohibited from managing underlying cloud infrastructure, comprising a processor, a memory coupled to the processor, and a computer-readable hardware storage device coupled to the processor, the storage device containing program code configured to be run by the processor via the memory to implement a method for isolating a source of an attack that originates from a shared computing environment, the method comprising:

the processor intercepting an outgoing network packet that originates from a first tenant of the shared computing environment, where the outgoing network packet does not identify the first tenant as a sender of the outgoing network packet; and the processor adding to the outgoing network packet a tag that identifies the first tenant, where the adding makes it possible for an external recipient of the outgoing network packet to identify that the outgoing network packet originated from the first tenant.

15. The computer program product of claim 14, where the external recipient is capable of determining, as a function of the identifying, how to block a future network packet originating from the first tenant without blocking future network packets originating from other tenants of the shared computing environment.

16. The computer program product of claim 14, where the outgoing network packet is an IPv6 packet and where the tag is an extension header of the IPv6 packet.

17. The computer program product of claim 14, where the outgoing network packet is an IPv4 packet and where the tag is an unused field of the IPv4 packet.

18. The computer program product of claim 14, where the first tenant is a software container.

19. The computer program product of claim 14, where the shared computing environment is a cloud-computing environment on which has been provisioned one or more Platform-as-a-Service platforms.

20. The computer program product of claim 14, where the first tenant has been infected by malware and where the outgoing network packet is generated as part of a distributed denial-of-service attack upon the external recipient.

* * * * *